(12) United States Patent
Chen

(10) Patent No.: US 7,180,674 B2
(45) Date of Patent: Feb. 20, 2007

(54) POLYGONAL PRISM

(75) Inventor: Tony K. T. Chen, Pingjen (TW)

(73) Assignee: Quarton, Inc. (TW)

( * ) Notice: Subject to any disclaimer, the term of this patent is extended or adjusted under 35 U.S.C. 154(b) by 0 days.

(21) Appl. No.: 11/014,639

(22) Filed: Dec. 16, 2004

(65) Prior Publication Data

US 2005/0259337 A1 Nov. 24, 2005

Related U.S. Application Data

(63) Continuation-in-part of application No. 10/850,181, filed on May 20, 2004, now abandoned.

(51) Int. Cl.
*G02B 27/14* (2006.01)
*G02B 5/04* (2006.01)

(52) U.S. Cl. .............................. 359/638; 359/834
(58) Field of Classification Search ........ 359/638–640, 359/833–834, 629, 636
See application file for complete search history.

(56) References Cited

U.S. PATENT DOCUMENTS

| 4,859,066 | A | * | 8/1989 | Sommargren | ............... | 356/487 |
| 6,160,665 | A | * | 12/2000 | Yuan | ........................... | 359/629 |
| 6,400,512 | B1 | * | 6/2002 | Hildebrandt | ................ | 359/639 |

* cited by examiner

*Primary Examiner*—Alicia M Harrington
(74) *Attorney, Agent, or Firm*—Raymond Sun

(57) ABSTRACT

A polygonal prism receives at least one incident light and generates at least one outward light. The prism includes a plurality of planes, with the prism made from one piece of material.

13 Claims, 8 Drawing Sheets

US 7,180,674 B2

POLYGONAL PRISM

RELATED CASES

This is a continuation-in-part of Ser. No. 10/850,181, filed May 20, 2004 now abandoned, whose disclosure is incorporated by this reference as though fully set forth herein.

BACKGROUND OF THE INVENTION

1. Field of the Invention

The present invention relates to a polygonal prism, and in particular, to a polygonal prism that can be used to convert an incoming ray of light into separate light rays.

2. Description of the Prior Art

The advancements in technology have made laser appliances useful for a wide variety of applications. Examples include laser levelers for use in marking lines in engineering work, and optical instruments or lenses for survey instruments. A polygonal prism is a basic part of these laser devices.

Conventional polygonal prisms are typically provided in the form of two pieces (e.g., a triangular three-dimensional piece and a pentagonal three-dimensional piece) that are glued together to form the polygonal prism. Selected planes or surfaces of the two pieces are coated with semi-reflective film or fully reflective film to alter the path of a light beam that is directed at selected planes or surfaces of the polygonal prism. Specifically, the incident (i.e., incoming) light is refracted or reflected to change the directions of the light, so that the polygonal prism outputs a plurality of light beams that are emitted at desired and precise angles with respect to each other.

Unfortunately, precision in the bonding of the two prism pieces is critical. Specifically, the two prism pieces must be bonded precisely before undergoing precision polishing. In addition, for the emitted light outputs to be accurate, certain surfaces or planes of the two prism pieces must be precisely parallel to each other after the two prism pieces are bonded together. Unfortunately, this precise bonding can be difficult and expensive to accomplish.

SUMMARY OF THE INVENTION

It is an object of the present invention to provide a polygonal prism that is made in a single piece.

It is another object of the present invention to provide a polygonal prism which is provided at lower costs.

It is yet another object of the present invention to provide a polygonal prism which accurately receives and emits light.

In order to achieve the objectives of the present invention, there is provided a polygonal prism that receives at least one incident light and generates at least one outward light. The prism includes a plurality of planes, with the prism made from one piece of material.

DETAILED DESCRIPTION OF THE PREFERRED EMBODIMENTS

Figure 1A:
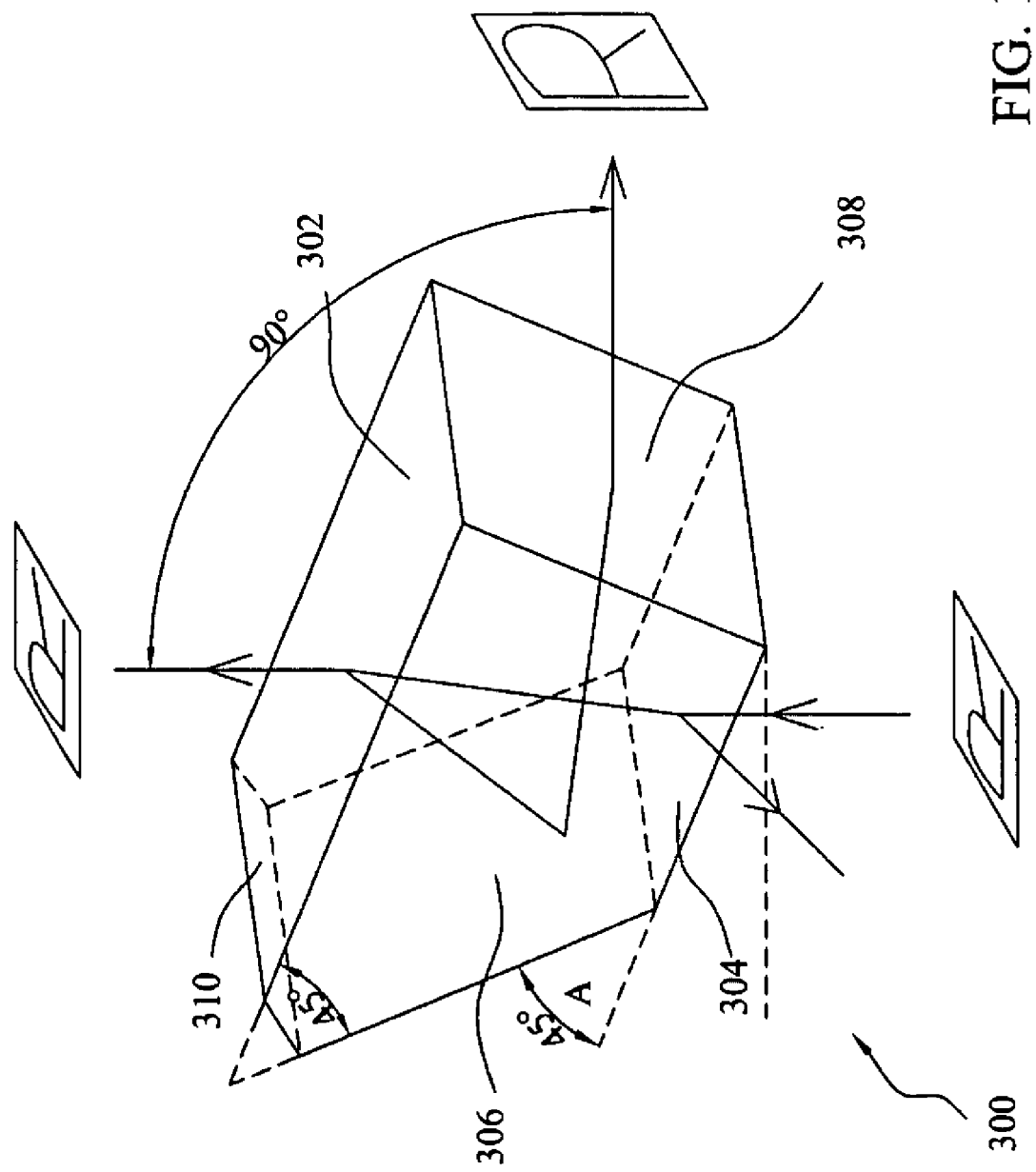
FIG. 1A is a perspective view of a pentagonal prism according to one embodiment of the present invention.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

FIG. 1 illustrates a polygonal prism 300 according to one embodiment of the present invention. The prism 300 can be made of glass or plastic, and has a first plane 302, a second plane 304, a third plane 306, a fourth plane 308 and a fifth plane 310. The first plane 302 and the second plane 304 are parallel and opposite to each other. The fourth plane 308 is connected, and perpendicular, to the first plane 302. The third plane 306 is connected to the second plane 304. The second and third planes 304, 306 extend at lines that intersect at an angle A, which can be any angle less than 90 degrees. The first and third planes 302, 306 are not connected to each other, but the first and third planes 302, 306 also extend at lines that intersect at the same angle A. Angle A can be any angle, and in one embodiment of the present invention, angle A is 45 degrees. The fifth plane 310 connects the first and third planes 302, 306, and essentially crosses the first and third planes 302, 306.

When viewed from the side (e.g., see FIGS. 1B and 2), the prism 300 has a pentagonal shape. The prism 300 can be a piece of optical plastic or glass that is made in one piece by plastic injection.

Figure 1B:
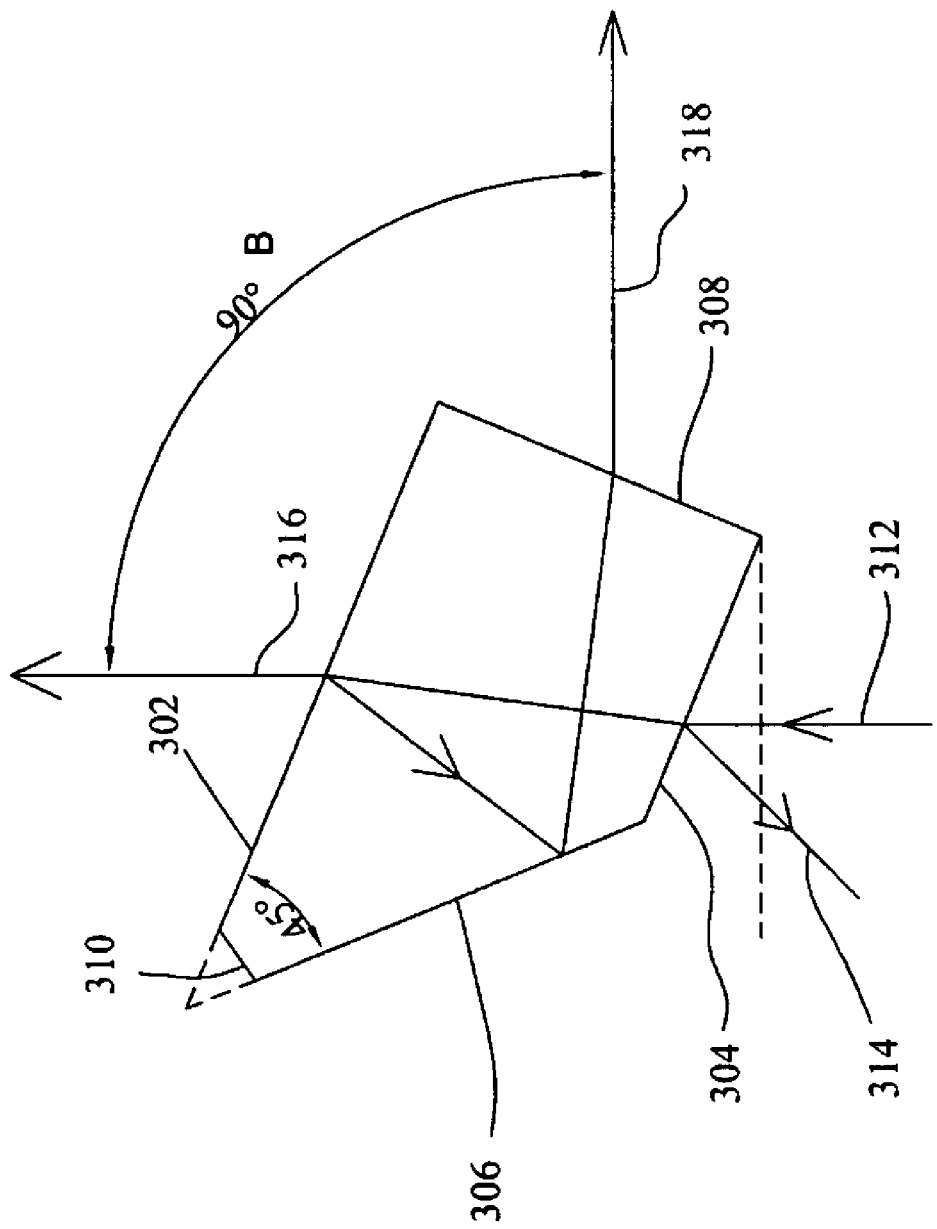
FIG. 1B illustrates one set of possible light trajectories for the prism of FIG. 1A.

In the embodiment of FIGS. 1A and 1B, the first plane 302 and the second plane 304 are coated with a partially reflective film, and the third plane 306 is coated with a fully reflective film. When incident light 312 is introduced into the prism 300 from the second plane 304 at an inclined angle (see FIG. 1B), the partially reflective film on the second plane 304 will reflect part of the incident light 312 as a first outward light 314. The remainder of the incident light 312 is refracted by the second plane 304 and travels to the first plane 302. Since the first plane 302 is coated with a partially reflective film, part of the incident light 312 reaching the first plane 302 will be refracted outside the prism 300 as a second outward light 316, and part of the incident light 312 reaching the first plane 302 will be reflected towards the third plane 306. Since the third plane 306 is coated with a fully reflective film, all of the incident light 312 reaching the third plane 306 will be reflected towards the fourth plane 308, where it is refracted outside the prism 300 as a third outward light 318. Here, since (i) the first plane 302 is parallel to the second plane 304, (ii) the fourth plane 308 is perpendicular to the first plane 302 and the second plane 304, and (iii) the first and third planes 302, 306 extend at lines that intersect at an angle of A, the introduction of the incident light 312 would generate two outward lights 316 and 318 that are spaced apart at an angle of two times angle A (i.e., 2×A). If angle A is 45 degrees, then the outward lights 316, 318 would be perpendicular (i.e., 90 degrees, see angle B) to each other.

Figure 2:
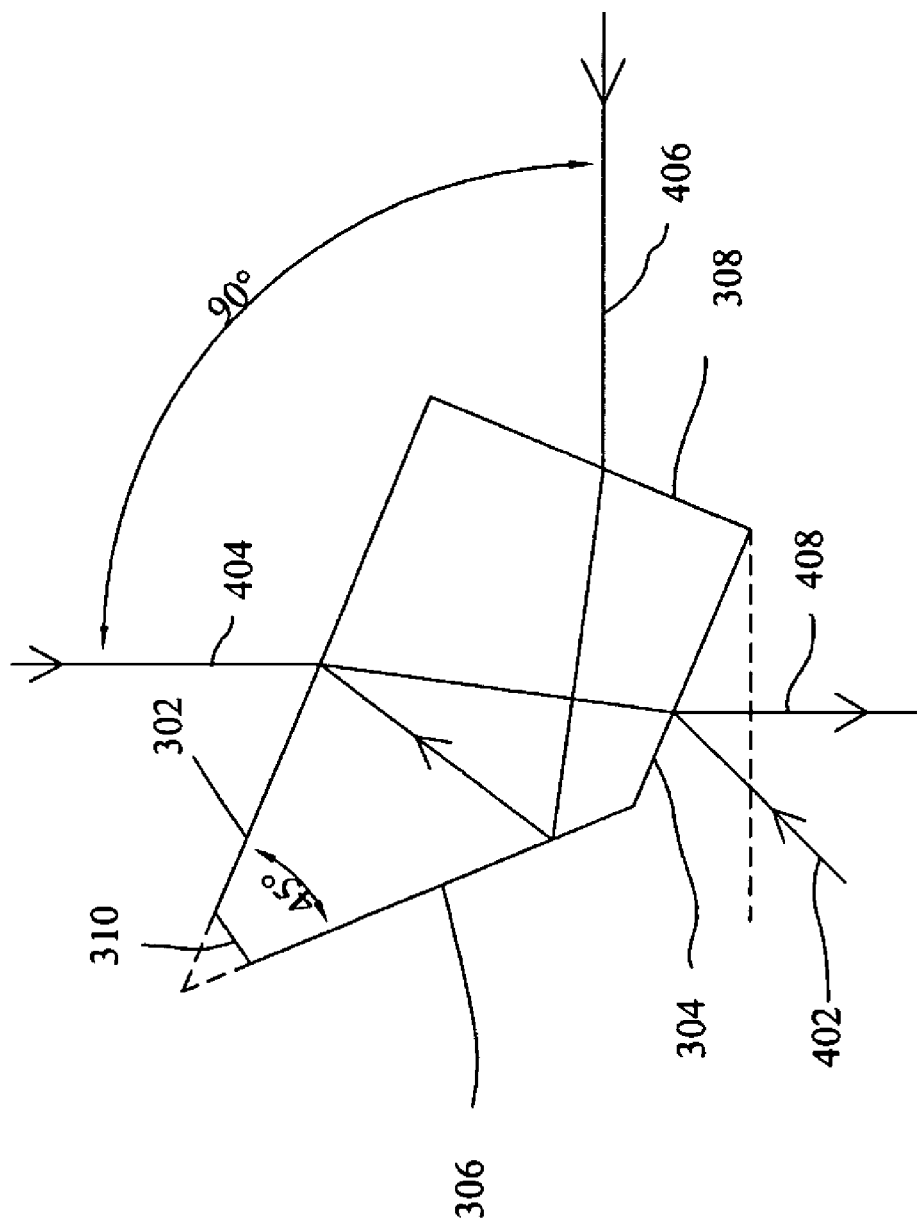
FIG. 2 illustrates another set of possible light trajectories for the prism of FIG. 1A.

FIG. 2 illustrates the introduction of three incident lights 402, 404 and 406 into the same prism 300. The three incident lights 402, 404 and 406 are introduced at the same angles as the outward lights 314, 316 and 318, respectively, into the second plane 304, the first plane 302, and the fourth plane 308, respectively. The three incident lights 402, 404 and 406 generate an outgoing light 408 that exits the second plane 304 along the same direction as the incident light 312 in FIG. 1B.

In one embodiment of the present invention, the first plane 302 may be coated with red light for passing and green light for reflection, the second plane 304 may be coated with red light and green light for passing and blue light for reflection. If a white light is introduced into the prism 300 in the same direction as the incident light 312, the first outward light 314 would then be blue, the second outward light 316 would be red, and the third outward light 318 would then be green. Similarly, if the three incident lights 402, 404 and 406 are blue, red and green, respectively, then the combined outward light 408 would be white light.

Figure 3A:
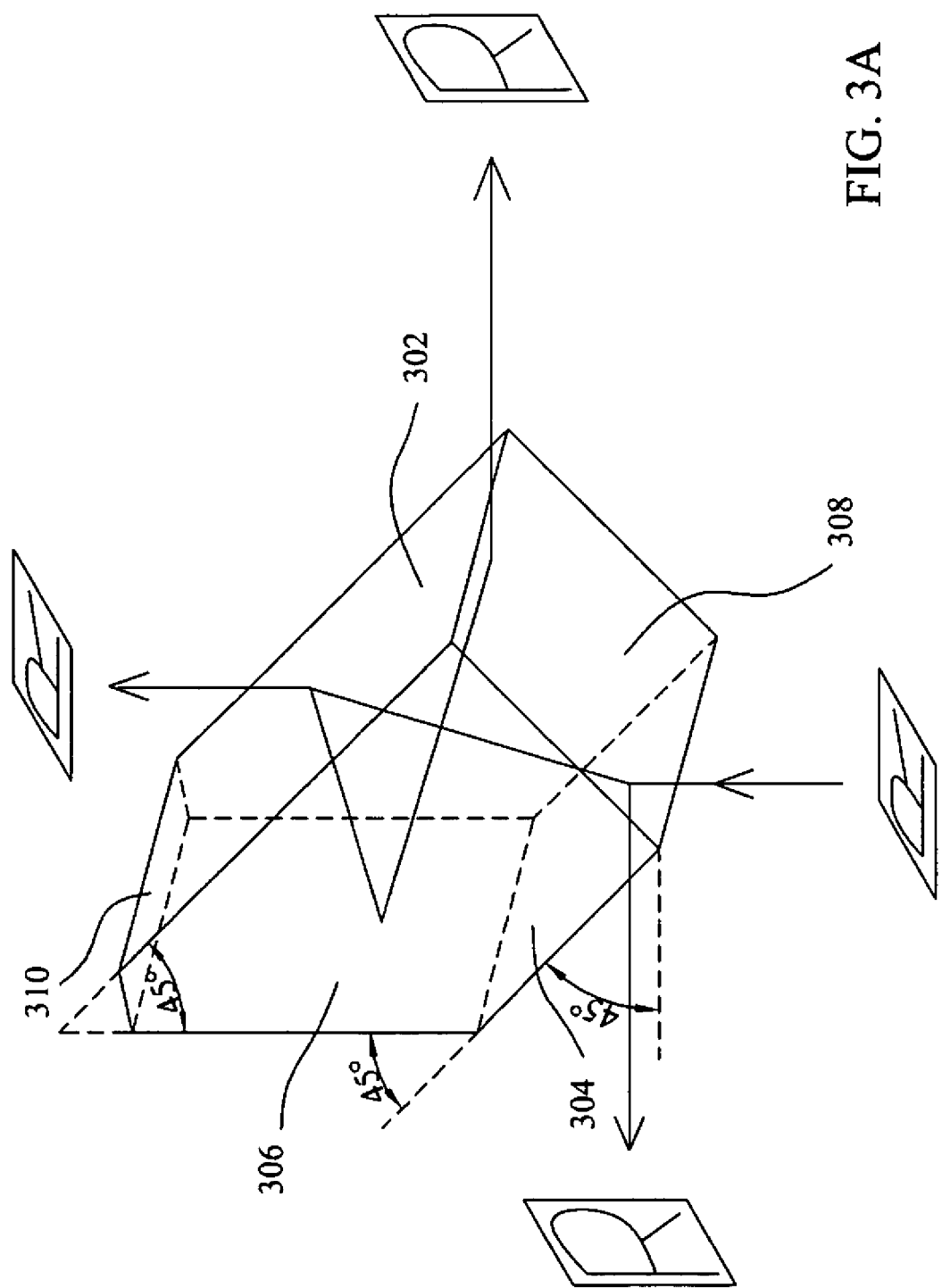
FIG. 3A is a perspective view of the pentagonal prism of FIG. 1A with the incident light being introduced at a different angle than in FIG. 1A.
Figure 3B:
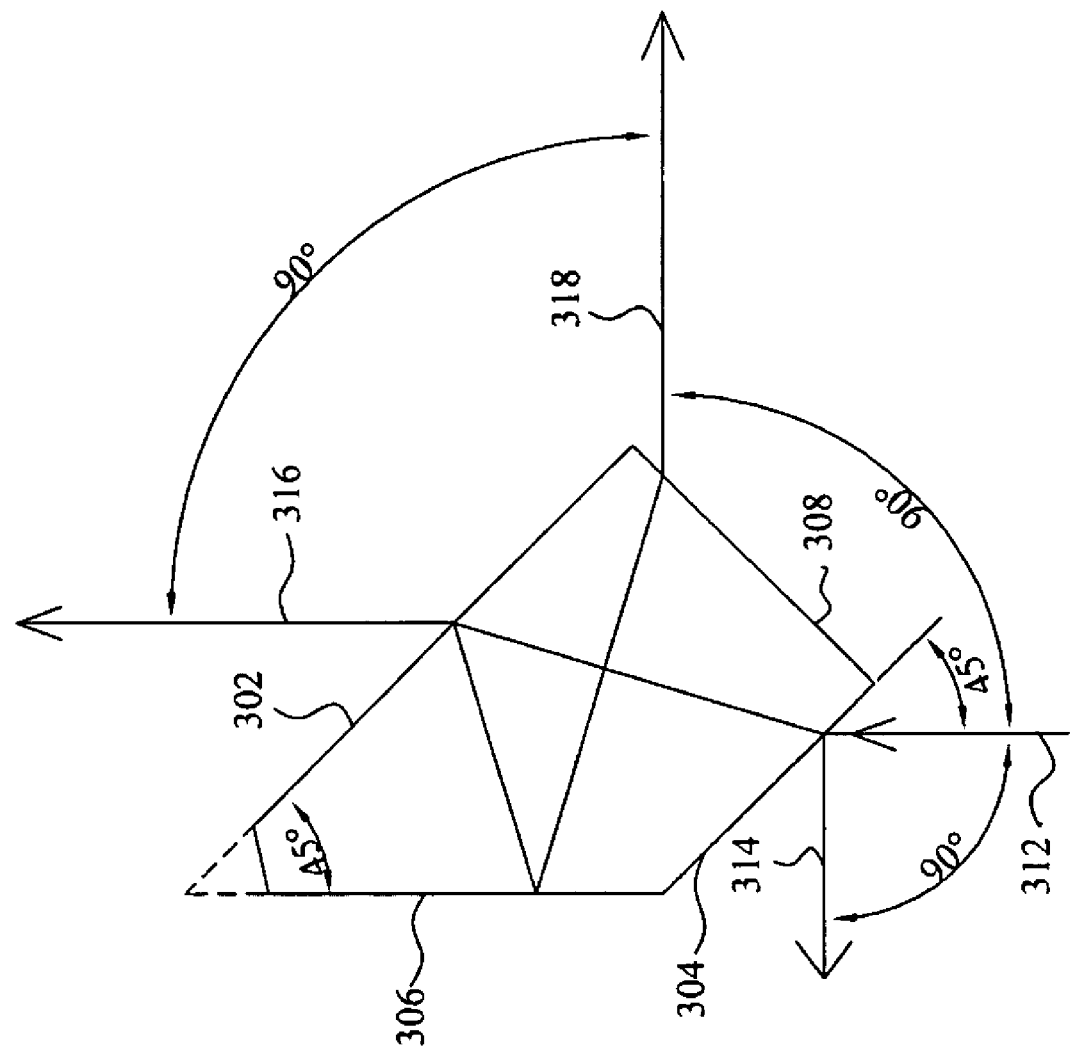
FIG. 3B illustrates one set of possible light trajectories for the prism of FIG. 3A.

Referring to FIGS. 3A and 3B, when incident light 312 is introduced into the prism 300 from the second plane 304 at an angle of 45 degrees with respect to the second plane 304 (see FIG. 3B), the partially reflective film on the second plane 304 will reflect part of the incident light 312 as a first outward light 314. The remainder of the incident light 312 is refracted by the second plane 304 and travels to the first plane 302. Since the first plane 302 is coated with a partially reflective film, part of the incident light 312 reaching the first plane 302 will be refracted outside the prism 300 as a second outward light 316, and part of the incident light 312 reaching the first plane 302 will be reflected towards the third plane 306. Since the third plane 306 is coated with a fully reflective film, all of the incident light 312 reaching the third plane 306 will be reflected towards the fourth plane 308, where it is refracted outside the prism 300 as a third outward light 318. Here, the introduction of the incident light 312 at an angle of 45 degrees with respect to the second plane 304 would generate three outward lights 314, 316 and 318 that are perpendicular to each other.

Figure 4:
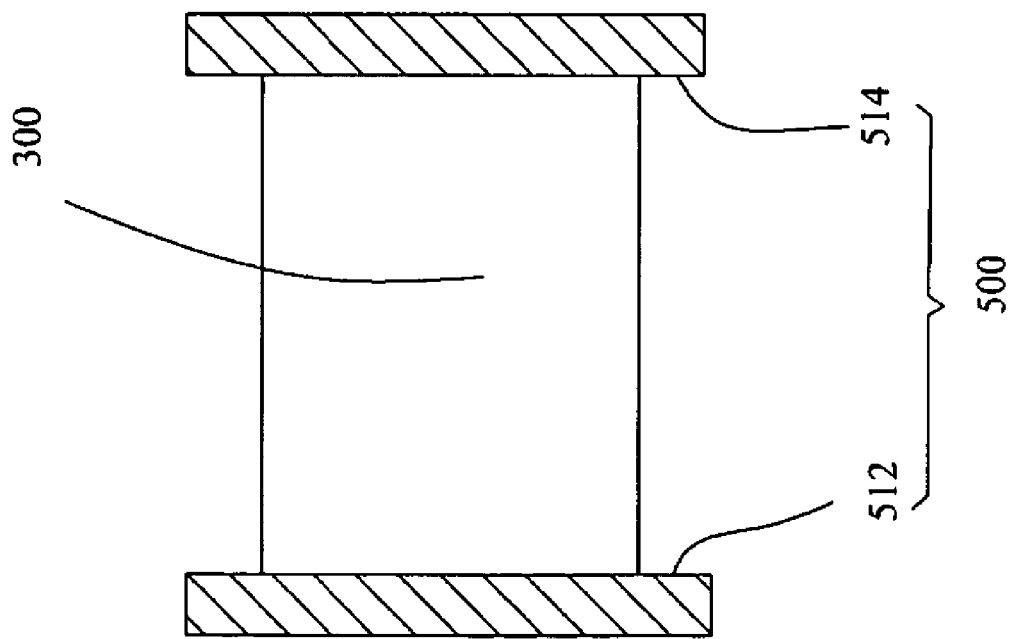
FIG. 4 illustrates the prism of FIG. 1A supported by a carriage.

FIG. 4 illustrates the prism 300 supported by a carriage 500 which has a first surface 512 and a second surface 514 that are bonded to opposite surfaces (e.g., first plane 302 and second plane 304, respectively) of the prism 300.

Figure 5A:
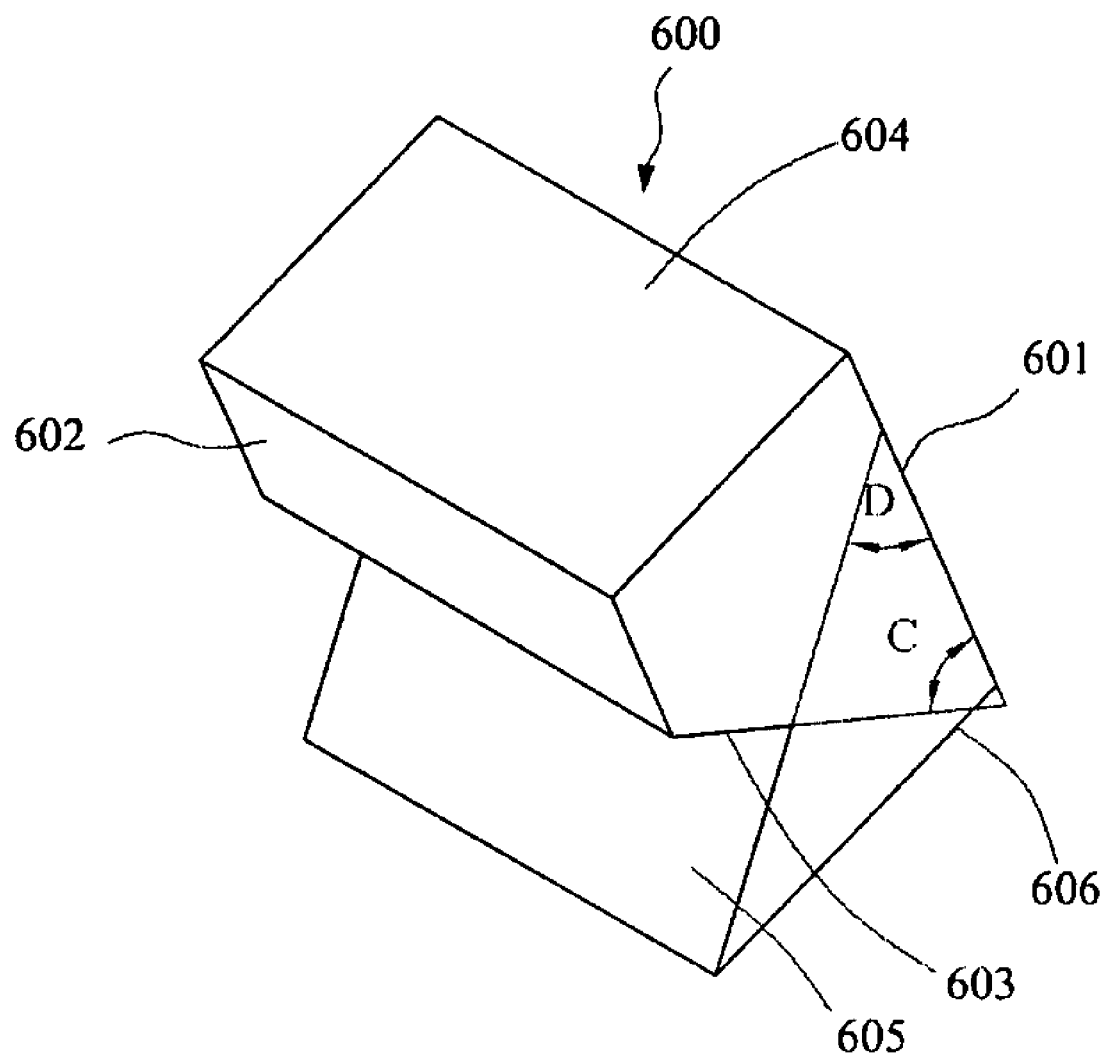
FIG. 5A is a perspective view of a polygonal prism according to another embodiment of the present invention.
Figure 5B:
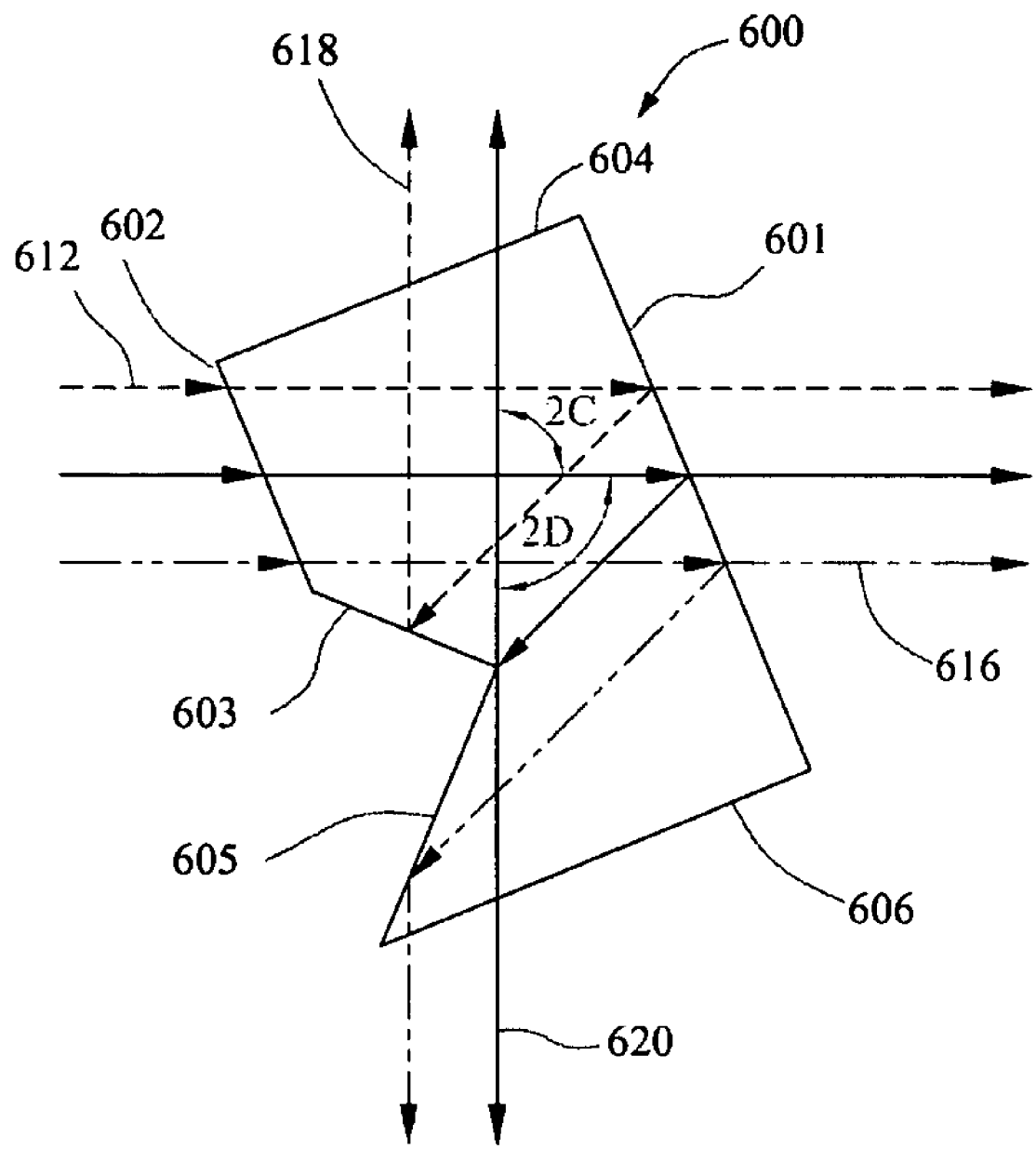
FIG. 5B illustrates one set of possible light trajectories for the prism of FIG. 5A.

FIGS. 5A and 5B illustrate a polygonal prism 600 according to another embodiment of the present invention. The prism 600 can be made of glass or plastic, and has a first plane 601, a second plane 602, a third plane 603, a fourth plane 604, a fifth plane 605 and a sixth plane 606. The first plane 601 and the second plane 602 are parallel and opposite to each other. The fourth and sixth planes 604, 606 are connected to the first plane 601, and are also perpendicular to the first plane 601 and opposite to each other. The second plane 602 is perpendicular to the fourth plane 604. The third plane 603 extends at an angle from the second plane 602. The first plane 601 and the third plane 603 are not connected to each other, but the first plane 601 and the third plane 603 extend at lines that intersect at an angle C. Angle C can be any angle less than 90 degrees, and in one embodiment of the present invention, angle C is 45 degrees. The fifth plane 605 is connected to the third plane 603 and the sixth plane 606, and extends at an angle from the sixth plane 606. The first plane 601 and the fifth plane 605 are not connected to each other, but the first plane 601 and the fifth plane 605 extend at lines that intersect at an angle D. Angle D can also be any angle less than 90 degrees, and in one embodiment of the present invention, angle D is 45 degrees. Thus, in the embodiment where the angle C is 45 degrees and the angle D is 45 degrees, the angle between the third plane 603 and the fifth plane 605 would be ninety degrees.

In the embodiment of FIGS. 5A and 5B, the first plane 601 is coated with a partially reflective film, and the third plane 603 and the fifth plane 605 are coated with a fully reflective film. When incident light 612 is introduced into the prism 600 from the second plane 602 at an inclined angle (see FIG. 5B), the incident light 612 is refracted by the second plane 602 and travels to the first plane 601. Since the first plane 601 is coated with a partially reflective film, part of the incident light 612 reaching the first plane 601 will be refracted outside the prism 600 as a first outward light 616, and part of the incident light 612 reaching the first plane 601 will be reflected towards the third plane 603 and the fifth plane 605. Since the third plane 603 and the fifth plane 605 are each coated with a fully reflective film, the incident light 612 reaching the third plane 603 will be reflected towards the fourth plane 604 where it is refracted outside the prism 600 as a second outward light 618. Similarly, the incident light 612 reaching the fifth plane 605 will be reflected towards the sixth plane 606, where it is refracted outside the prism 600 as a third outward light 620. Here, as mentioned above, the angle between the first outward light 616 and the second outward light 618 is two times angle C (i.e., 2×C), and the angle between the first outward light 616 and the third outward light 620 is two times angle D (i.e., 2×D). Thus, if angle C and D are each 45 degrees, then the first outward light 616 would be perpendicular (i.e., 90 degrees) to the second outward light 618 and the third outward light 620.

Although the description hereinabove has described coating certain planes with partially-reflective or fully reflective films, it is possible to coat any of the planes 302, 304, 306, 308, 601, 602, 603, 605 with no film, a partially reflective film, or a fully reflective film, depending on the desired light outputs. It is also possible to provide coatings in other patterns to decompose the white incident light into any desired set of outgoing lights having different colors. It is further possible to combine a plurality of incident lights of any set of different colors to produce a single outward light of any desired colors. The implementation of these alternatives would be well-known to a person of ordinary skill in the art given the disclosures made hereinabove.

Thus, the polygonal prisms 300, 600 of the present invention may be made in one piece using a simple process, rather than by bonding two separate prism pieces. As a result, the prisms 300, 600 can be made using less time and work, thereby reducing their cost.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A polygonal prism that receives at least one incident light and generates at least one outward light, comprising:
   a first plane coated with a partially reflective film;
   a second plane parallel with the first plane, and coated with a partially reflective film;
   a third plane that crosses the first and second planes at an angle A, the third plane being coated with a fully reflective film; and
   a fourth plane that is perpendicular to the first and second planes;
   wherein the prism is made from one piece of material.

2. The prism of claim 1, further including a fifth plane that crosses the first and third planes.

3. A polygonal prism that receives at least one incident light and generates at least one outward light, comprising:
a first plane;
a second plane parallel with the first plane;
a third plane that crosses the first and second planes at an angle A; and
a fourth plane that is perpendicular to the first and second planes;
wherein the prism is made from one piece of material; and
wherein an incident light introduced to the second plane generates a first outward light from the second plane, a second outward light from the first plane, and a third outward light from the fourth plane, with the second and third outgoing lights having an angle B which is two times the angle A.

4. The prism of claim 3, wherein the angle A is 45 degrees and the angle B is 90 degrees.

5. A polygonal prism that receives at least one incident light and generates at least one outward light, comprising:
a one-piece block having:
a first plane;
a second plane parallel with the first plane;
a third plane that crosses the first and second planes at an angle A; and
a fourth plane that is perpendicular to the first and second planes; and
a carriage having a first surface attached to one of the planes of the one-piece block; and
wherein an incident light introduced to the second plane generates a first outward light from the second plane, a second outward light from the first plane, and a third outward light from the fourth plane, with the second and third outgoing lights having an angle B which is two times the angle A.

6. The prism of claim 5, wherein the angle A is 45 degrees and the angle B is 90 degrees.

7. A polygonal prism, comprising:
a second plane that receives an incident light;
a first plane parallel with the second plane, the first plane adapted for reflecting part of the incident light to generate a reflection light and refracting part of the incident light to generate a first outward light;
a fourth plane that is perpendicular to the first and second planes; and
a third plane having a line that crosses the first and second planes at an angle C, the third plane adapted for reflecting the reflection light to pass through the fourth plane as a second outward light;
wherein the angle between the first and second outward lights is two times the angle C.

8. The prism of claim 7, wherein the second plane is coated with a partially reflective film.

9. The prism of claim 8, wherein the third plane is coated with a fully reflective film.

10. The prism of claim 7, wherein the angle C is 45 degrees.

11. The prism of claim 7, further comprising:
a sixth plane that is perpendicular to the first and second planes; and
a fifth plane having a line that crosses the first and second planes at an angle D, the fifth plane adapted for reflecting part of the reflection light to pass through the sixth plane as a third outward light;
wherein the angle between the first and third outward lights is two times the angle D.

12. The prism of claim 11, wherein the fifth plane is coated with a fully reflective film.

13. The prism of claim 11, wherein the angle D is 45 degrees.

* * * * *